US010630747B2

(12) United States Patent
Qian et al.

(10) Patent No.: US 10,630,747 B2
(45) Date of Patent: Apr. 21, 2020

(54) INTEGER MULTIPLE DESCRIPTION CODING SYSTEM

(71) Applicant: Agora Lab, Inc., Santa Clara, CA (US)

(72) Inventors: Shie Qian, Irvine, CA (US); Yi Lv, Shanghai (CN); Ruofei Chen, Shanghai (CN); Zehua Gao, Shanghai (CN); Siqiang Yao, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 356 days.

(21) Appl. No.: 15/842,431

(22) Filed: Dec. 14, 2017

(65) Prior Publication Data

US 2019/0190974 A1  Jun. 20, 2019

(51) Int. Cl.
| | |
|---|---|
| *H04L 29/06* | (2006.01) |
| *H04N 19/96* | (2014.01) |
| *H04N 19/39* | (2014.01) |
| *H04N 19/89* | (2014.01) |

(52) U.S. Cl.
CPC ........ *H04L 65/607* (2013.01); *H04L 65/4076* (2013.01); *H04N 19/39* (2014.11); *H04N 19/96* (2014.11); *H04N 19/89* (2014.11)

(58) Field of Classification Search
CPC .................................................. H04L 65/607
See application file for complete search history.

(56) References Cited

U.S. PATENT DOCUMENTS

| | | | | |
|---|---|---|---|---|
| 10,097,844 B2* | 10/2018 | Saunders | ............... | H04N 19/33 |
| 2011/0051804 A1* | 3/2011 | Chou | ................... | H04N 19/117 |
| | | | | 375/240.03 |
| 2011/0069753 A1* | 3/2011 | Vitali | .................. | G10L 19/0208 |
| | | | | 375/240.03 |

* cited by examiner

*Primary Examiner* — Nicholas P Celani
(74) *Attorney, Agent, or Firm* — Young Basile Hanlon & MacFarlane, P.C.

(57) ABSTRACT

A method for decoding multiple descriptions for a media stream includes decoding at least one of a first description and a second description from the media bitstream, wherein the first description and the second description are associated with a current sample of the media bitstream and independently decodable; based on a determination that the second description is missing, reconstructing, by a decoder, the current sample by performing a third shifting operation on the first description, wherein the third shifting operation on the first description comprises left shifting the first description by one bit; and based on a determination that both the first description and the second description have been received, reconstructing, by the decoder, the current sample by summing the first description and the second description. An encoding method is also provided.

11 Claims, 10 Drawing Sheets

FIG. 6E

INTEGER MULTIPLE DESCRIPTION CODING SYSTEM

TECHNICAL FIELD

This disclosure relates to multiple description coding (MDC) techniques for media source signals, and in particular to multiple description coding based on integer operations.

BACKGROUND

Data compression techniques have been developed over the last several decades to reduce the large bandwidth needed by transmission of media (audio, video, or multimedia) data. One side effect of data compression is that the compressed media data is sensitive to data loss or noise, which can happen in best-effort networks. In some cases, loss of a few bits can cause an entire packet to be unrecognizable. As end user devices and network environments become more diversified, reliable media data transmission over noisy networks becomes more challenging.

To reduce data loss in media transmission over noisy networks, various techniques have been developed, such as Forward Error Correction (FEC), Automatic Repeat Request (ARQ), and Packet Loss Concealment (PLC). For example, multiple description coding (MDC) can be used for error-resilient media transmission.

SUMMARY

Disclosed herein are implementations of methods, apparatuses, and systems for multiple description coding based on integer operations.

In one aspect, a method for encoding multiple descriptions for a media stream is disclosed. The method includes determining, for a current sample of the media stream, an integer equivalent based on the value of the current sample; determining a first description for the current sample by performing a first shifting operation on the current sample, wherein the first shifting operation comprises right shifting the current sample by one bit; based on a determination that the integer equivalent is an even number, determining a second description for the current sample by performing the first shifting operation on the current sample, wherein each of the first description and the second description is independently decodable; and based on a determination that the integer equivalent is an odd number, determining the second description for the current sample by performing a second shifting operation on the current sample, wherein the second shifting operation comprises right shifting the current sample by one bit and adding one bit.

In another aspect, a method for decoding multiple descriptions for a media stream is disclosed. The method includes decoding at least one of a first description and a second description from the media bitstream, wherein the first description and the second description are associated with a current sample of the media bitstream and independently decodable; based on a determination that the second description is missing, reconstructing, by a decoder, the current sample by performing a third shifting operation on the first description, wherein the third shifting operation on the first description comprises left shifting the first description by one bit; and based on a determination that both the first description and the second description have been received, reconstructing, by the decoder, the current sample by summing the first description and the second description.

In another aspect, a method for decoding multiple descriptions for a media stream is disclosed. The method includes decoding, for a current sample and from the media bitstream, a multiple description number indicative of a total number of description encoded for the current sample; based on a determination that the total number of descriptions received by a decoder is less than the multiple description number, reconstructing the current sample by performing a lookup operation on the descriptions received by the decoder, wherein the lookup operation comprises obtaining an estimation of the current sample by using a lookup table based on at least one of the multiple description number and the descriptions received by the decoder; and based on a determination that the total number of descriptions received by the decoder is the same as the multiple description number, reconstructing the current sample by summing the descriptions received by the decoder.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6E is a diagram showing example encoding and decoding results for samples in a certain value range.

DETAILED DESCRIPTION

Figure 1:
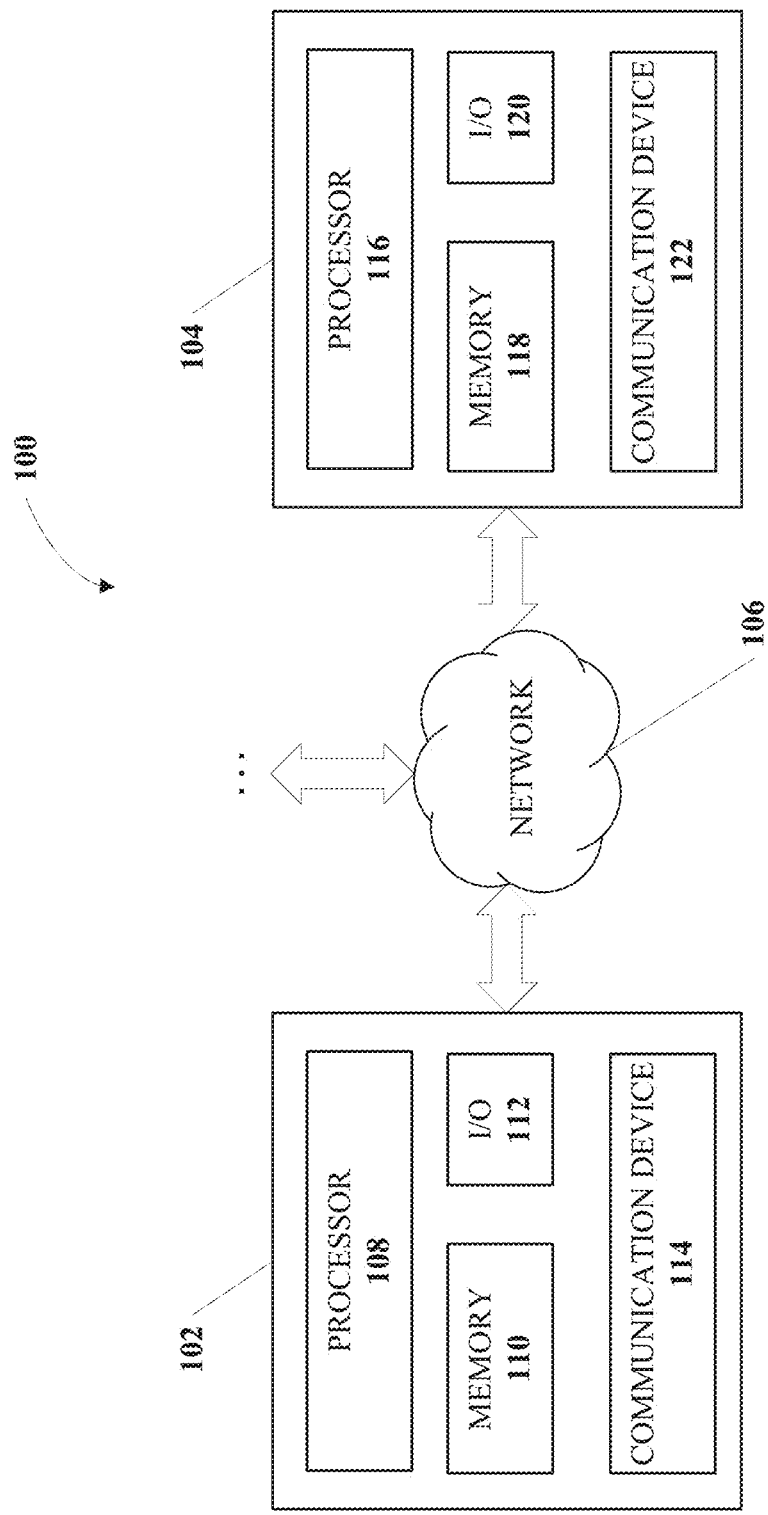
FIG. 1 is a diagram of an example system for media transmission using MDC techniques according to implementations of this disclosure.

Online multimedia data sharing, such as a video conference call, a live-stream video broadcasting, or an Internet phone service, requires media data transmission with efficiency and fidelity. The media data can include audio data, video data, or any multimedia data including an audio sequence or a video sequence. Typically, media data can be stored in its original form or converted to form a media source stream. The media source stream can include time sequence data (e.g., an audio sequence including multiple audio samples, or a video sequence including multiple pictures or frames), feature extracted residuals of the media source stream (e.g., a residual picture after inter-prediction for a current picture in a video sequence), or equivalent quantities of the media source stream in a transformed domain (e.g., transformed and/or quantized coefficients). The media source stream can be encoded (or "compressed") into a media bitstream for transmission over a network.

Certain coding techniques (e.g., MP-3 and MP-4) can be used to improve decoding quality in progressive transmission as the number of received consecutive packets increases. The improvement of the coding quality can be achieved when all earlier packets have been received. However, when the order of the packets is received out of sequence (e.g., when a packet is lost or received late), the decoding process for those coding techniques can be interrupted until the lost packet is received. In those cases, excessive delays can occur at the decoder.

Multiple description coding (MDC) is a technique that can divide a media (e.g., audio, video, or multimedia) stream into multiple sub-streams (referred to as "descriptions") for encoding and decoding. Each description can provide an approximation to a media source stream. Each description can represent the media source stream with a certain level of fidelity or confidence. Each description can be independently decoded.

An MDC-compatible decoder can decode one or more descriptions or a subset of the descriptions to reconstruct the media source stream. For a decoder receiving multiple descriptions, a media stream can be reconstructed using an approximation of the media source stream by using the multiple descriptions, the quality of which can be better than a media stream reconstructed using any individual description. The more descriptions received, the higher fidelity the decoded media stream can achieve. Better signal preprocessing techniques of the MDC are strived for to improve MDC coding quality and reduce computation cost.

By introducing a certain level of redundancy for mitigating the effect of packet loss, MDC can provide error resilience to media stream transmission. In MDC, an arbitrary subset of the descriptions can be used to reconstruct the media stream. When network congestion or packet loss occurs, which is common in best-effort networks (e.g., the Internet), the media stream can be reconstructed with a loss of quality (e.g., resolution or fidelity) without interruption. In some cases, the quality of the media stream is roughly proportional to the data rate sustained by the decoder.

Development of the MDC techniques can focus on one of two categories. The first category focuses on designing specific transforms or filterbanks to obtain the MDC properties, in which the MDC techniques can be performed after the transform stage and before the quantization stage. The second category focuses on designing specific quantizers to meet the MDC constraints, in which the MDC techniques can be performed after the quantization stage that follows the transform stage.

According to implementations of this disclosure, a signal (e.g., audio and/or video signal) can be divided into samples. The signal can be represented by a media source stream (also referred to as media stream). To decompose a sample into two descriptions, an integer value of the current sample is used for the calculation. When the integer value is even (i.e., in a binary form, the least significant bit of the sample is "0"), each description is determined by right shifting the sample by one bit. When the integer value is odd (i.e., the least significant bit of the sample is "1"), one description is determined by right shifting the sample by one bit, and the other description is determined by right shifting the current sample by one bit, plus one bit. During reconstruction, when both descriptions are received, the sample is reconstructed by adding up the descriptions. When only one description is received, the sample is reconstructed by left shifting the received description by one bit.

By using integer operation, MDC implementations of this disclosure simplifies computation and improves efficiency. When both descriptions are received, the reconstruction can be lossless. When at least one description is lost, uniform (or near uniform) estimation error can be achieved, and the error becomes smaller as the value of the sample gets larger. For an even number (i.e., least significant bit of the sample is zero), the original sample can be perfectly recovered from either the first or the second description. At an encoder, the two-description decomposition can also extend to multiple descriptions (M>2) by using a binary tree structure for decomposing. At a decoder, a lookup table (or the binary tree structure) can be used for reconstruction.

According to implementations of this disclosure, the disclosed methods, apparatuses, and systems can adapt to different data types or computation environments, such as integer, fixed-point, or floating point. In addition, the disclosed methods, apparatuses, and systems for MDC encoding and decoding can be used in any computing system as a software or hardware module, and can be performed for any image, audio, video, or other digital-signal system with any bounded signal dynamic range, including but not limited to 8- or 10-bit images or videos, 8-, 16-, or 24-bit digital audio signals, 32-bit floating-point digital audio signals, or small-bit (e.g., 2-bit) digital signals. It should be noted that the applications and implementations of this disclosure are not limited to the aforementioned examples, and alternations, variations, or modifications of the implementations of this disclosure can be achieved to minimize quantization errors for any computation environment.

FIG. 1 is a diagram of an example system 100 for media transmission using MDC techniques according to implementations of this disclosure. As shown in FIG. 1, the system 100 can include multiple apparatuses and networks, such as an apparatus 102, an apparatus 104, and a network 106. The apparatuses can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider, e.g., a web host, or a cloud service provider. In some implementations, the computing device can be implemented in the form of multiple groups of computers which are at different geographic locations and can communicate with one another, such as by way of a network. While certain operations can be shared by multiple computers. In some implementations, different computers are assigned with different operations. In some implementations, the system 100 can be implemented using general-purpose computers/processors with a computer program that, when executed, carries out any of the respective methods, algorithms, and/or instructions described herein. In addition, or alternatively, for example, special purpose computers/processors including specialized hardware can be utilized for carrying out any of the methods, algorithms, or instructions described herein.

The apparatus 102 can have an internal configuration of hardware including a processor 108 and a memory 110. The processor 108 can be any type of device or devices capable of manipulating or processing information. In some implementations, the processor 108 can include a central processor (e.g., a central processing unit or CPU). In some implementations, the processor 108 can include a graphics processor (e.g., a graphics processing unit or GPU). Although the examples herein can be practiced with a single processor as shown, advantages in speed and efficiency can be achieved using more than one processor. For example, the processor 108 can be distributed across multiple machines or devices (each machine or device having one or more of processors) that can be coupled directly or connected via a network (e.g., a local area network). The memory 110 can include any transitory or non-transitory device or devices capable of storing codes and data that can be accessed by the processor (e.g., via a bus). The memory 110 herein can be a random access memory device (RAM), a read-only memory device (ROM), an optical/magnetic disc, a hard drive, a solid state drive, a flash drive, a security digital (SD) card, a memory stick, a compact flash (CF) card, or any combination of any suitable type of storage device. In some implementations, the memory 110 can be distributed across multiple machines or devices, such as a network-based memory or cloud-based memory. The memory 110 can include data (not shown), an operating system (not shown), and an application (not shown). The data can include any data for processing (e.g., an audio stream, a video stream, or a multimedia stream). The application can include programs that permit the processor 108 to implement instructions to generate control signals for performing functions of the methods in the following description.

In some implementations, in addition to the processor 108 and the memory 110, the apparatus 102 can also include a secondary (e.g., external) storage device (not shown). When present, the secondary storage device can provide additional memory when high processing needs exist. The secondary storage device can be a storage device in the form of any suitable non-transitory computer-readable medium, such as a memory card, a hard disc drive, a solid state drive, a flash drive, or an optical drive. Further, the secondary storage device can be a component of the apparatus 102 or can be a shared device accessible via a network. In some implementations, the application in the memory 110 can be stored in whole or in part in the secondary storage device and loaded into the memory 110 as needed for processing.

In addition to the processor 108 and the memory 110, the apparatus 102 can include input/output (I/O) devices. For example, the apparatus 102 can include an I/O device 112. The I/O device 112 can be implemented in various ways, for example, it can be a display that can be coupled to the apparatus 102 and configured to display a rendering of graphic data. The I/O device 112 can be any device transmitting a visual, acoustic, or tactile signal to a user, such as a display, a touch-sensitive device (e.g., a touch screen), a speaker, an earphone, a light-emitting diode (LED) indicator, or a vibration motor. The I/O device 112 can also be any type of input device either requiring or not requiring user intervention, such as a keyboard, a numerical keypad, a mouse, a trackball, a microphone, a touch-sensitive device (e.g., a touch screen), a sensor, or a gesture-sensitive input device. If the I/O device 112 is a display, for example, it can be a liquid crystal display (LCD), a cathode-ray tube (CRT), or any other output device capable of providing a visible output to an individual. In some cases, an output device can also function as an input device—a touchscreen display configured to receive touch-based input, for example.

The I/O device 112 can alternatively or additionally be formed of a communication device for transmitting signals and/or data. For example, the I/O device 112 can include a wired mean for transmitting signals or data from the apparatus 102 to another device. For another example, the I/O device 112 can include a wireless transmitter or receiver using a protocol compatible to transmit signals from the apparatus 102 to another device or to receive signals from another device to the apparatus 102.

In addition to the processor 108 and the memory 110, the apparatus 102 can optionally include a communication device 114 to communicate with another device. Optionally, the communication can be via a network 106. The network 106 can be one or more communications networks of any suitable type in any combination, including, but not limited to, networks using Bluetooth communications, infrared communications, near field connections (NFC), wireless networks, wired networks, local area networks (LAN), wide area networks (WAN), virtual private network (VPN), cellular data networks, or the Internet. The communication device 114 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the apparatus 102 to provide functions of communication with the network 106.

Similar to the apparatus 102, the apparatus 104 includes a processor 116, a memory 118, an I/O device 120, and a communication device 122. The implementations of elements 116-122 of the apparatus 104 can be similar to the corresponding elements 108-114 of the apparatus 102. For example, the apparatus 102 can be used as a decoding apparatus (referred to as a "decoder"), and the apparatus 104 can be used as an encoding device (referred to as an "encoder"), or vice versa. The apparatus 102 can communicate with the apparatus 104 via the network 106. The apparatuses 102 and 104 can also communicate with other apparatuses (not shown) connected to the network 106.

The apparatuses 102 and 104 (and algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors, or any other suitable circuit. In this disclosure, the term "processor" should be understood as encompassing any the foregoing, either singly or in combination. The terms "signal," "data," and "information" are used interchangeably. Further, portions of the apparatuses 102 and 104 do not necessarily have to be implemented in the same manner.

It should be noted that parts or components of the MDC-compatible coding devices (e.g., apparatuses 102 and 104) and systems can include elements not limited to those shown in FIG. 1. Without departing the scope of this disclosure, the MDC-compatible coding devices and systems can include more or fewer parts, components, and hardware or software modules for performing various functions in addition or related to MDC encoding and decoding.

Figure 2:
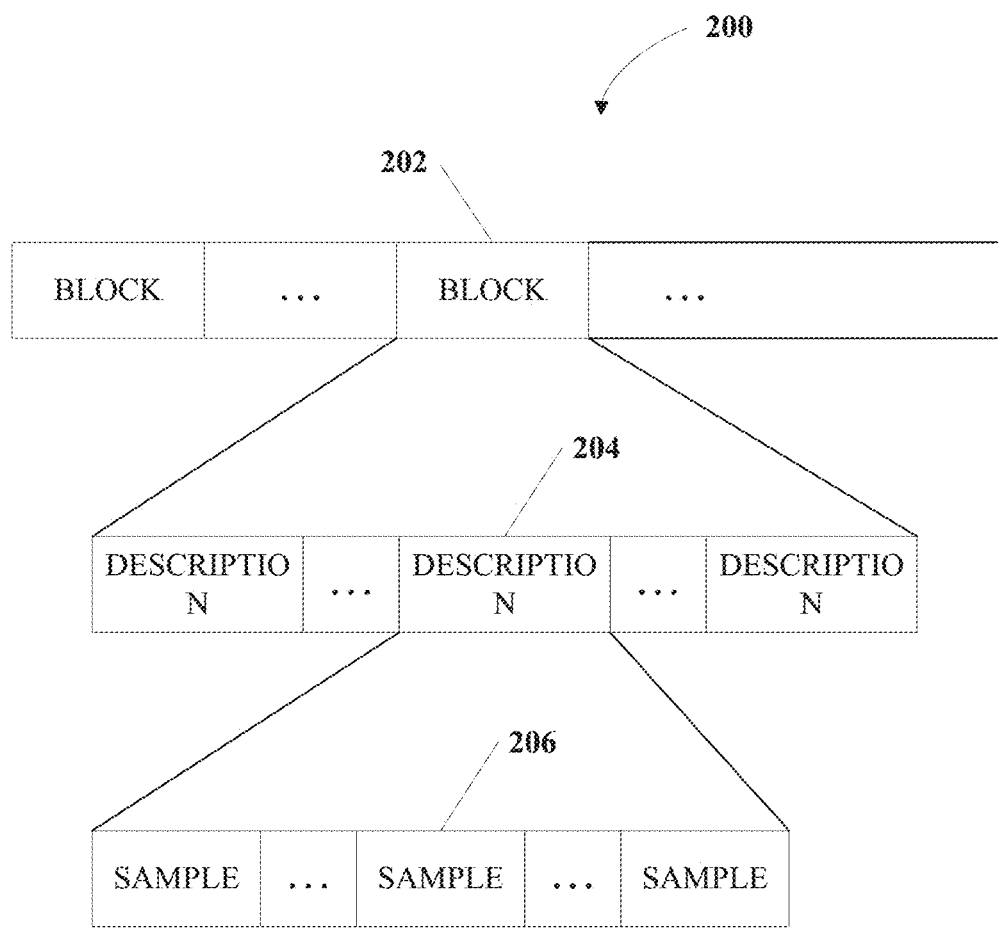
FIG. 2 is a diagram of example structures of a media source stream.

FIG. 2 shows example structures of a media source stream 200. As shown in FIG. 2, the media source stream 200 is divided into consecutive blocks, including a current block 202. The consecutive blocks, including the current block 202, can have identical structures. For example, the current block 202 can include multiple descriptions (e.g., M descriptions), including a description 204. The descriptions of the current block 202, including the description 204, can also have identical structures. For example, the description 204 can be further divided into multiple samples (e.g., a current sample 206). A sample can refer to, for example, any coding unit of the audio or video stream, such a sequence, a block, a description, a portion of a block or description, a slice, a tile, etc. If the media source stream 200 is an audio stream, for example, a sample of the description 204 (e.g., the current sample 206) can be a coding unit of audio data (e.g., an audio sequence unit). If the media source stream is a video stream, for example, a sample of the description 204 (e.g., the sample 206) can be a coding unit of video data (e.g., a block, a macroblock, a sequence, a slice, a tile, or a picture).

Other structures can also be used for the media source stream 200. For example, the media source stream 200 can be divided into samples without being divided into blocks. Implementations of this disclosure can take any structures (whether blocks are used or not) and use the samples as input. In another example, the media source stream 200 can be divided into blocks, which are divided into samples. Each sample can be decomposed into multiple descriptions during encoding, and at least one description can be used to reconstruct the current sample during decoding, for example.

Figure 3:
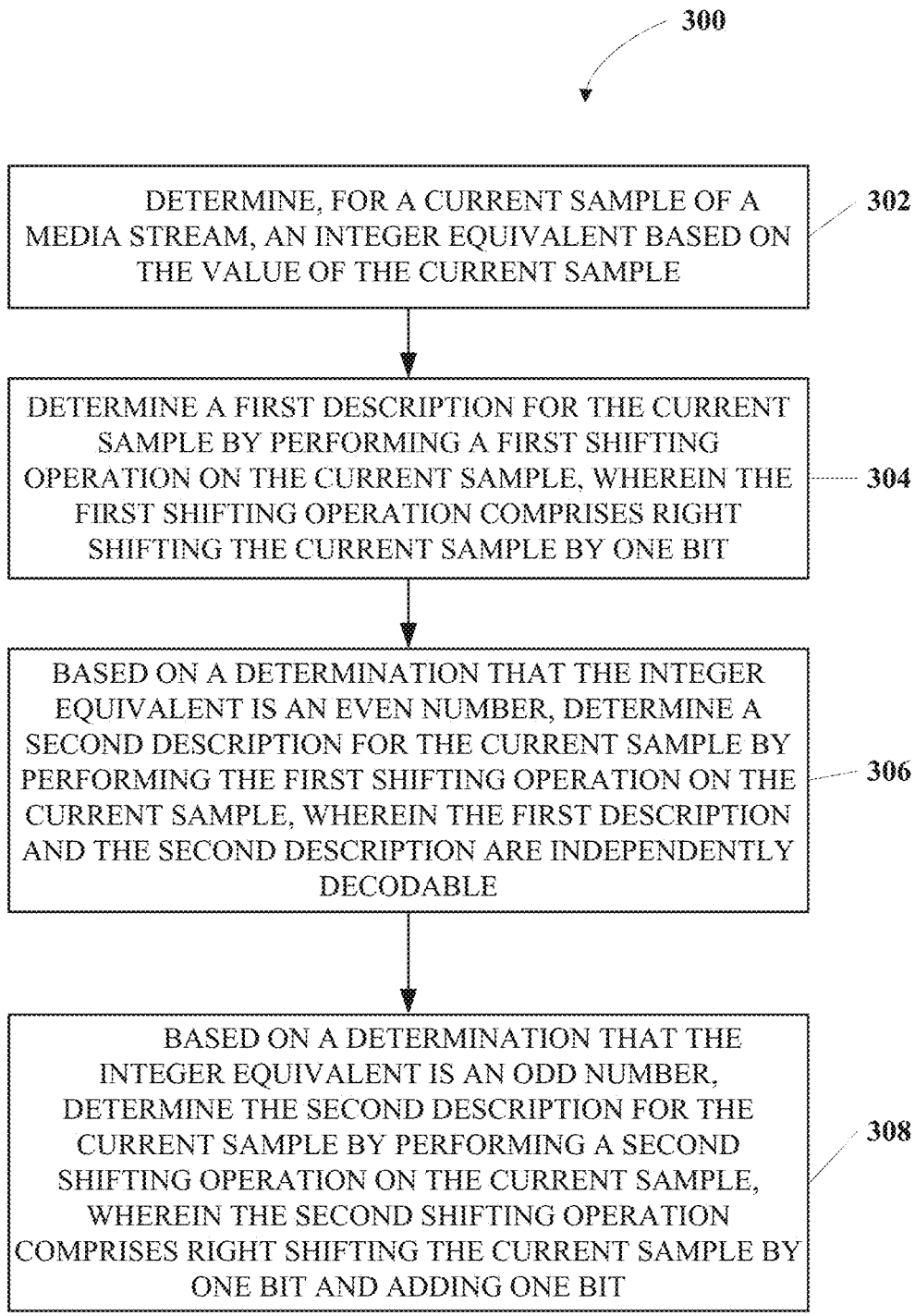
FIG. 3 is a flowchart of an example process of multiple description encoding based on integer operations according to implementations of this disclosure.

FIG. 3 is a flowchart of an example process 300 of encoding multiple descriptions based on integer operations for a media source stream according to implementations of this disclosure. The media source stream can include an audio source stream, a video source stream, or any media stream including audio and/or video data. The process 300 can be implemented as software and/or hardware modules in the system 100 in FIG. 1. For example, the process 300 can be implemented as modules included in an encoder (e.g., the apparatus 104 in FIG. 1). The operations of the process 300 can also be implemented as machine-readable instructions at, for example, decomposition stage 704 in the process 700 in FIG. 7. In other implementations, some or all of the operations of the process 300 can also be implemented at other stages in FIG. 7. The process 300 includes operations 302-308 to produce two descriptions for a current sample from the media source stream, which are set forth as follows. For those implementations that include generating more than two descriptions for the current sample, process 300 can be used multiple times (e.g. iteratively) by generating two descriptions for the current sample each time. In other words, the process 300 can be considered as "basic building blocks" for multiple description coding using integer operations, regardless of how many multiple descriptions are generated for each sample.

In some implementations, prior to operation 302, the media source stream can be divided or decomposed into consecutive samples. The media source stream can include one-dimensional (e.g., audio data), two-dimensional (e.g., 2D video data), a combination of audio and video data, or any other media data (e.g., 3D video data, virtual reality visual data). In some implementations, multi-dimensional media data can be converted or transformed to be one-dimensional using existing techniques. For ease of explanation, the media source stream will be described as one-dimensional hereinafter, and it should be noted that the operations for the one-dimensional media source stream can be derived to be applied to multi-dimensional media source streams, which is transformable to one-dimensional, without any creative effort.

At operation 302, an integer equivalent is determined for the current sample based on the value of the current sample. The integer equivalent determined for the current sample can be an integer number indicative of the value of the current sample. In a first example, the current sample can be a binary number "1101", a four-bit binary number. The integer equivalent for the current sample is "13". In a second example, the current sample can be a binary number "1010", and the integer equivalent for the current sample is "10".

At operation 304, a first description is determined for the current sample by performing a first shifting operation on the current sample, wherein the first shifting operation comprises right shifting the current sample by one bit. The first description can be determined by right shifting the binary number of the current sample by one bit. In the first example, the first description can be determined as "110". In the second example, the first description can be determined as "101".

At operation 306, based on a determination that the integer equivalent is an even number, a second description is determined for the current sample by performing the first shifting operation on the current sample, wherein each of the first description and the second description is independently decodable.

When the integer equivalent for the current sample is an even number, the second description can be determined by the same operation as the first description. In other words, when the integer equivalent for the current sample is an even number, the second description can be a duplicate of the first description. For example, in the second example, since the integer equivalent ("10") for current sample is an even number, the second description can be determined as "101", which is the same as the first description.

At operation 308, based on a determination that the integer equivalent is an odd number, determining the second description for the current sample by performing a second shifting operation on the current sample, wherein the second shifting operation comprises right shifting the current sample by one bit and adding one bit.

When the integer equivalent of the current sample is an odd number, the second description is determined by right shifting the binary number of the current sample by one bit, and adding one bit to the result. In the first example, since the integer equivalent of the current sample is an odd number ("13"), the second description is determined as "110" plus one bit ("1"), which becomes "111". Therefore, in the first example, the first description is "110", and the second description is "111".

In some implementations, an exception is made to the binary number having all "1"s. For example, for an eight-bit number "11111111", even though the integer equivalent ("15") is an odd number, operation 306 may be applied rather than operation 308. In other words, the number "11111111" is treated as if it was an even number. In this case, the first description and the second description are both "1111111". This exception simplifies calculation by a decoder (otherwise the second description would be "000000", not "111111", which needs to be dealt with as an exceptional case by the decoder). Using this exception, the decoder can just sum all descriptions while incurring a smaller error ($1/256$ in this example).

Figure 6A:
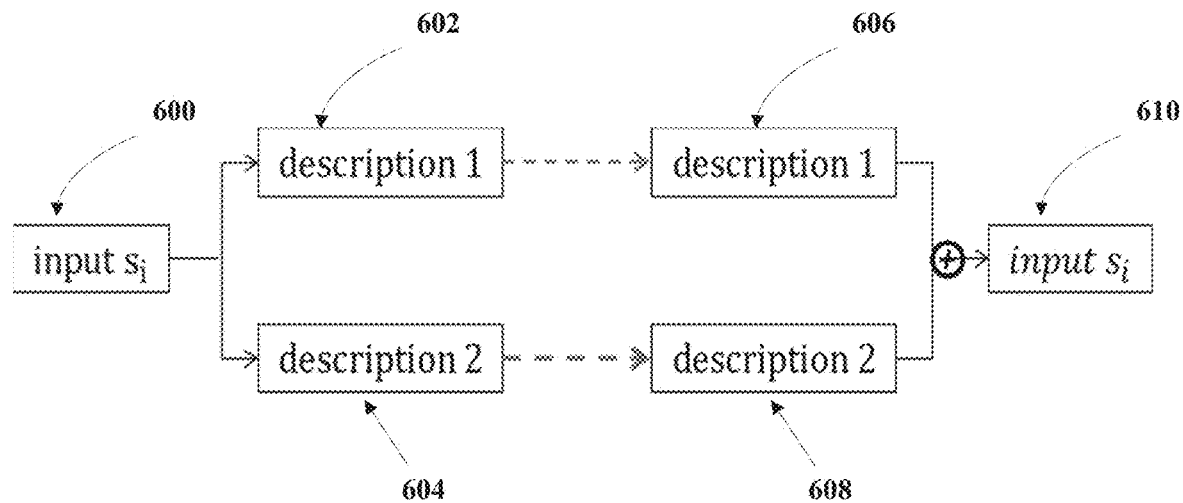
FIGS. 6A and 6B are examples of decomposing and reconstructing a current sample using multiple descriptions.

Referring to FIG. 6A as an illustrative example. A current sample from the media source stream is shown as "input Si" 600. For example, the current sample can be a digital sample. The first description is shown as "description 1" 602. "Description 1" 602 can be generated by right shifting "input Si" 600 by one bit. "Description 2" 604 can be generated by either operation 306 or operation 308, depending on whether "input Si" 600 is an odd or even number. When "input Si" 600 is an even number, "description 2" 604 can be the same as "description 1" 602. When "input Si" 600 is an odd number, "description 2" 604 can be the result of adding one bit to "description 1" 602.

The first description and the second description can be encoded using, for example, arithmetic coding or Huffman coding to generate the compressed media stream 710. In some implementations, the first description and the second description are encoded without using quantization.

When used as "basic building blocks" for those implementations that include generating more than two descriptions for the current sample, process 300 can include the following operations: identifying, for the current sample of the media stream, a multiple description number indicative of a total number of descriptions to be determined for the current sample; and performing a decomposition operation on the current sample, wherein the decomposition operation comprises forming a binary tree based on the multiple description number, and each description determined for the current sample is represented by a corresponding node of the binary tree.

Starting from the current sample as "the root" of the binary tree, two descriptions can be generated each time by repeating the operations 304-308, until the total number of descriptions determined for the current sample is the same as the multiple description number. Before the iteration ends, the decomposition operation can treat each description as the current sample, and repeat the operations 304-308. For example, when the multiple description number (M) is "4" (M=4), in a third example, at a first iteration using operations 304-308, the current sample "1100" can be decomposed into two descriptions "110" and "110". Description "110" can be further decomposed into two descriptions (both "11"). As a result, four descriptions ("11", "11", "11", "11") are generated for the current sample.

Figure 6B:
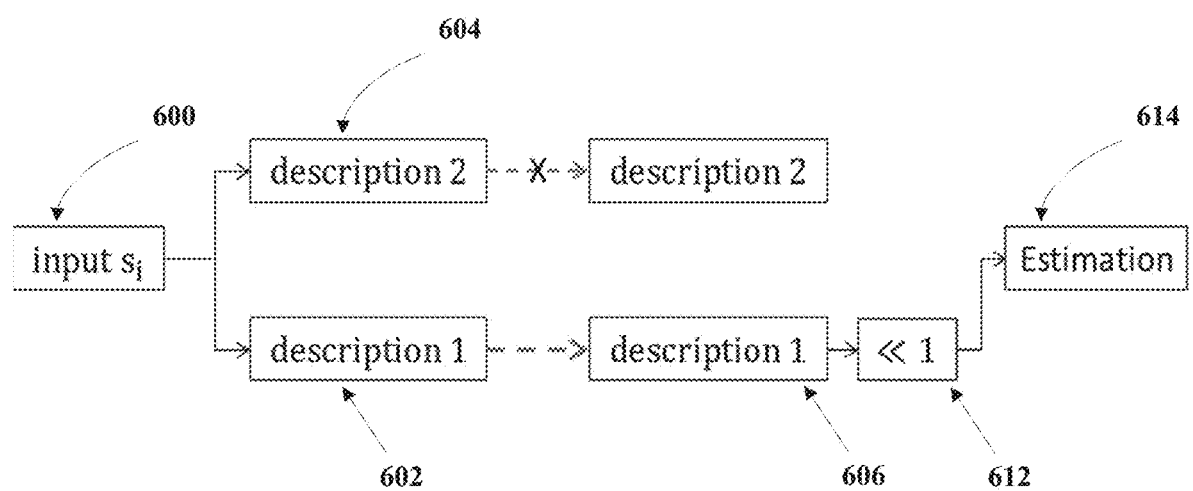
Figure 6C:
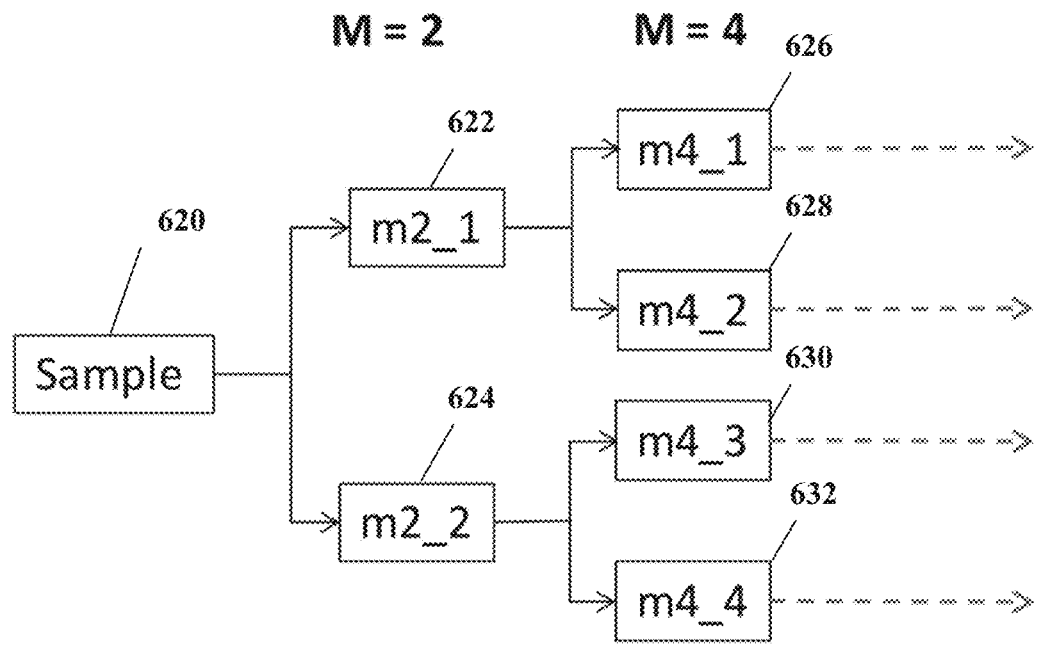
FIGS. 6C and 6D are examples of decomposing a current sample into multiple descriptions.

FIG. 6C shows example decompositions for multiple descriptions when M=4. For example, a first description "m2_1" 622 and a second description "m2_2" 624 can be generated for a sample 620. When M=4, m2_1 can be further decomposed into "m4_1" 626 and "m4_2" 628, and m2_2 can be further decomposed into "m4_3" 630 and "m4_4" 632, respectively. Here mi_j represents the j-th description for a total number of i descriptions.

Figure 6D:
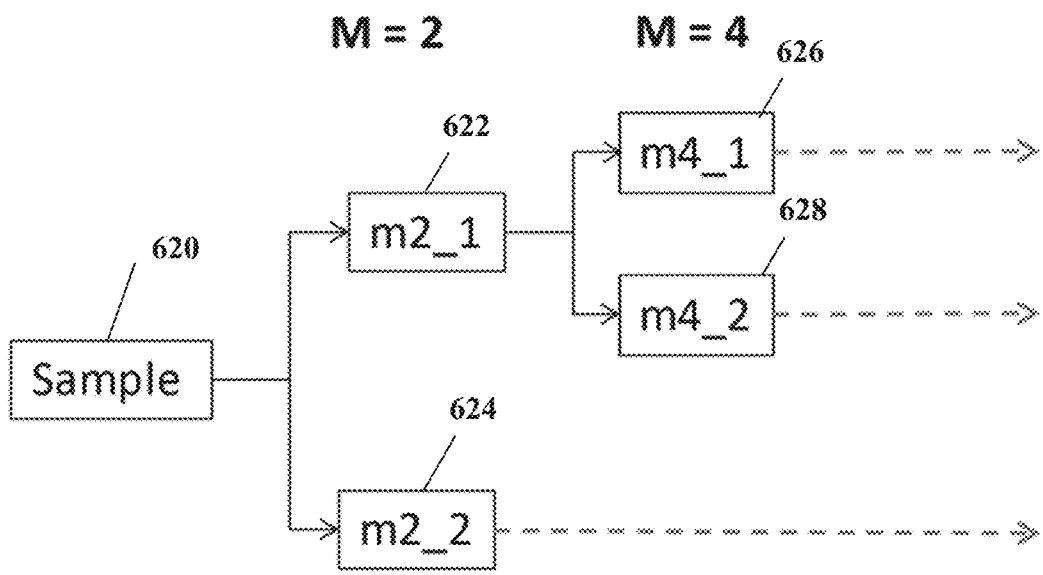

FIG. 6D shows example decompositions for multiple descriptions when M=3. For example, m2_1 can be further decomposed into m4_1 and m4_2, and m2_2 is not further processed, because there are already three descriptions determined for the sample 620.

The multiple description number and the descriptions determined for the current sample can be encoded into the compressed media stream 710. Compared to sending raw data samples M times, using M descriptions according to implementations of this disclosure can save M*ln M bits. In the examples when the size of the current sample is 8-bit, this can result in a 12.5% saving in coding costs (bits) when M=2, a 25% saving when M=4, and a 37.5% saving when M=8.

Figure 4:
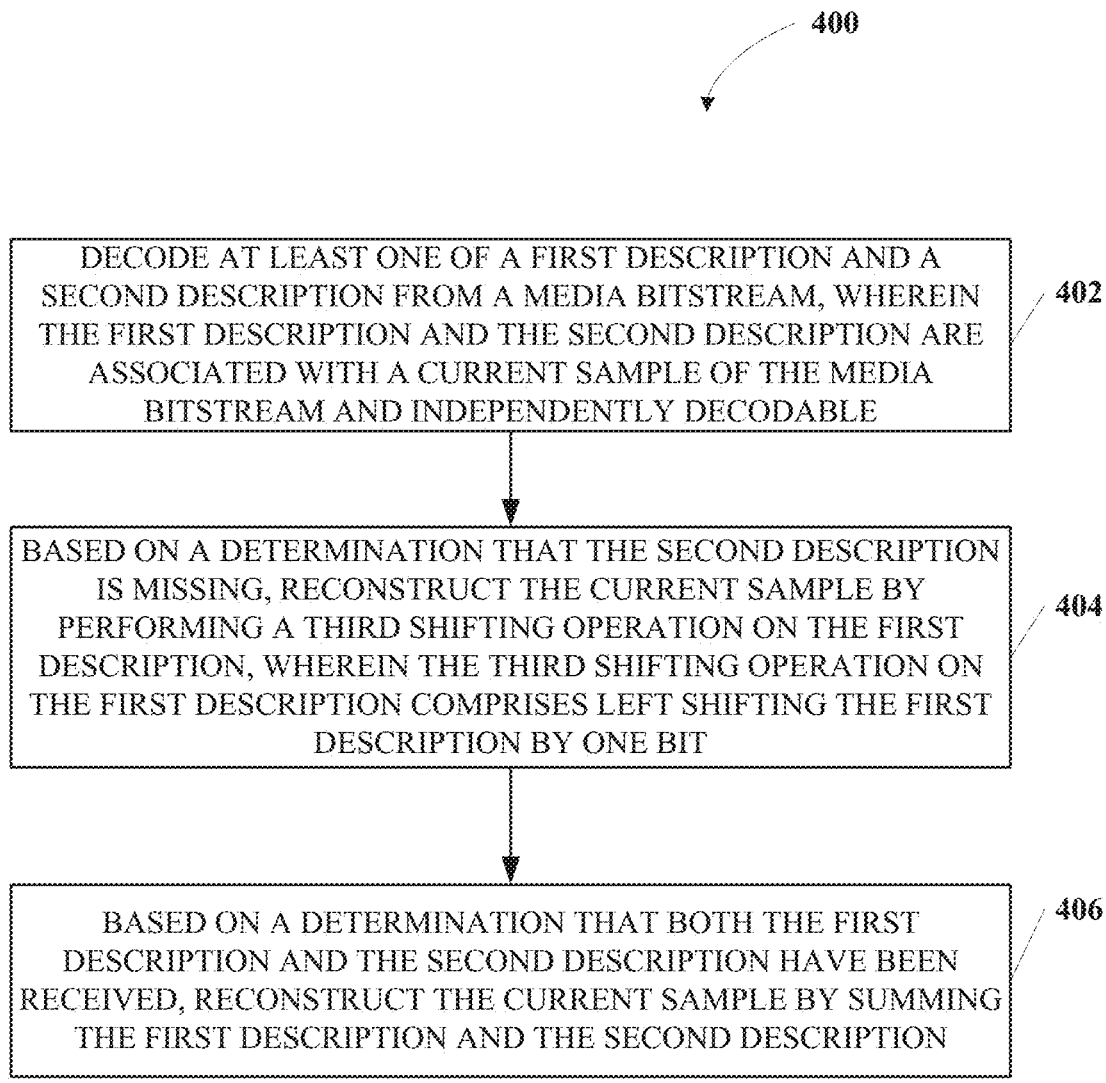
FIG. 4 is a flowchart of an example process of multiple description decoding based on integer operations according to an implementation of this disclosure.

FIG. 4 is a flowchart of an example process 400 of decoding a compressed media stream using multiple descriptions based on integer operations according to implementations of this disclosure. The compressed media stream can be included in a received media stream (e.g., a media bitstream). The reconstructed media stream can include an audio stream, a video stream, or any media stream including audio and/or video data. The process 400 can be implemented as software and/or hardware modules in the system 100 in FIG. 1. For example, the process 400 can be implemented as modules included in a decoder (e.g., the apparatus 102 in FIG. 1). The operations of the process 400 can also be implemented as machine-readable instructions at, for example, at least one of stages 804-808 of the process 800 in FIG. 8. The process 400 includes operations 402-406 to reconstruct a current sample from at least one of two descriptions from the received media stream, which are set forth as follows.

For those implementations that include reconstructing the current sample from more than two descriptions, several approaches can be used. In one approach, process 400 can be used multiple times (e.g. iteratively) by generating a current sample from two descriptions each time, such as by reversely traversing the decision tree determined at the decoder for the multiple descriptions. In another approach, which will be described below in process 500 of FIG. 5, a lookup operation is used by determining an estimation for the current sample from a lookup table.

At operation 402, at least one of a first description and a second description is decoded from the media bitstream, wherein the first description and the second description are associated with a current sample of the media bitstream and independently decodable.

In the example of FIG. 6A, both "description 1" 606 and "description 2" 608 are received. In the example of FIG. 6B, only "description 1" 606 is received, while "description 2" 608 was lost during transmission.

At operation 404, based on a determination that the second description is missing, the current sample is reconstructed by performing a third shifting operation on the first description, wherein the third shifting operation on the first description comprises left shifting the first description by one bit. Here the second description can refer to any of the two descriptions that is missing, such as "description 1" or "description 2". In the example of FIG. 6B, since "description 2" 608 was lost during transmission, the current sample is reconstructed by left shifting "description 1" 606 by one bit. The reconstructed sample is indicated by an estimation 614.

In the first example described above in the process 300, the current sample is represented by a binary number "1101", a four-bit binary number. The first description is "110", and the second description is "111". Assuming that the second description has been lost, the first description can be left shifted by one bit to generate the estimation 614, which is "1100". In this case, the estimation error is 1/13. More generally, when the integer equivalent of the current sample is an odd number, such as Si=2n+1, assume the first description D1=n and the second description D2=n+1. When only one description is received, left shifting of the one description will yield either 2n or 2n+2. In either case, the estimation error will be 1/Si. The larger the Si is, the smaller the estimation error becomes.

In a second example described above in the process 300, the current sample is represented by a binary number "1010", the integer equivalent for which is "10", an even number. Both the first description and the second description are "101". When only one description is received, left shifting of the one description will produce "1010", which is a lossless reconstruction of the original sample. More generally, when the integer equivalent of the current sample is an even number, such as Si=2n, the current sample can be reconstructed with no error despite packet loss.

At operation 406, based on a determination that both the first description and the second description have been received, the current sample is reconstructed by summing the first description and the second description. For example, in the example of FIG. 6A, since both "description 1" 606 and "description 2" 608 are received, the current sample is reconstructed by summing "description 1" 606 and "description 2" 608. The reconstructed sample is indicated by "input Si" 610.

In the first example, when both the first description "110" and the second description "111" are received, the current sample is reconstructed by summing "110" and "111", which becomes "1101", which is the same as the original sample "1101".

Figure 5:
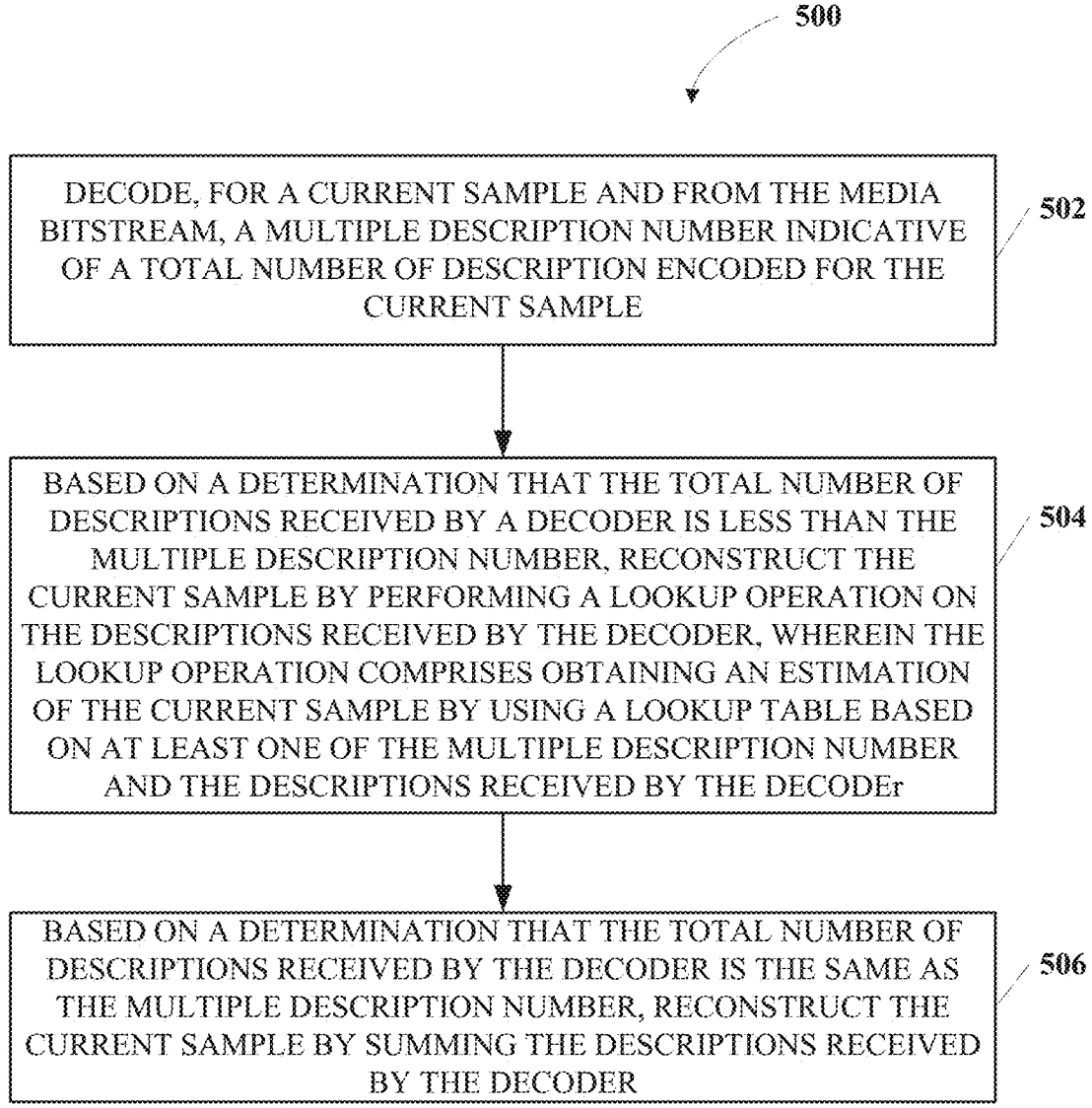
FIG. 5 is a flowchart of an example process of multiple description decoding based on integer operations according to another implementation of this disclosure.

FIG. 5 is a flowchart of an example process 500 of decoding a compressed media stream using multiple descriptions based on integer operations according to implementations of this disclosure. The compressed media stream can be included in a received media stream (e.g., a media bitstream). The reconstructed media stream can include an audio stream, a video stream, or any media stream including audio and/or video data. The process 500 can be implemented as software and/or hardware modules in the system 100 in FIG. 1. For example, the process 500 can be implemented as modules included in a decoder (e.g., the apparatus 102 in FIG. 1). The operations of the process 500 can also be implemented as machine-readable instructions at, for example, at least one of stages 804-808 in the process 800 in FIG. 8. The process 500 includes operations 502-506 to reconstruct a current sample from multiple descriptions (M>2) from the received media stream, which are set forth as follows. In the process 500 of FIG. 5, a lookup operation is used for determining an estimation for the current sample by referencing a lookup table.

At operation 502, a multiple description number indicative of a total number of description, which has been encoded for the current sample, is decoded for a current sample and from the media bitstream.

At operation 504, based on a determination that the total number of descriptions received by a decoder is less than the multiple description number, the current sample is reconstructed by performing a lookup operation on the descriptions received by the decoder, wherein the lookup operation comprises obtaining an estimation of the current sample by using a lookup table based on at least one of the multiple description number and the descriptions received by the decoder.

Figure 6E:
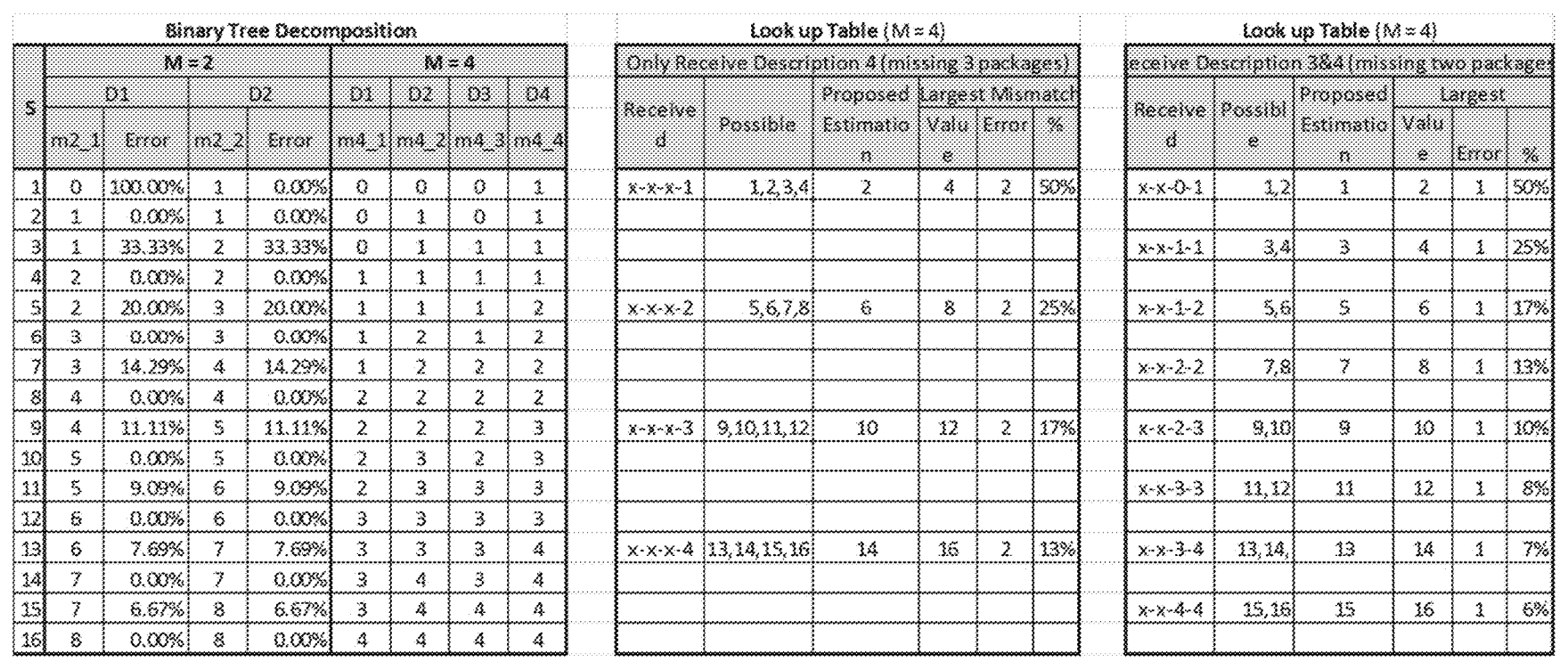

FIG. 6E shows example encoding and decoding results for samples having integer equivalent numbers in the range of 1-16 when M=2 or 4. The left table shows the results for the binary tree decomposition during encoding. For example, when the current sample "S" is an integer "2" ("0010" in binary form), the first description "D1" and the second description "D2" are both determined as integer "1" ("001" in binary form), according to the process 300 in FIG. 3. The errors for each description is 0.00%, since the current sample can be reconstructed without error by summing D1 and D2, or left shifting either description when the other one is missing.

The middle table shows a lookup table for the scenario when three out of four descriptions are missing and only description "D4" is received. Using a lookup table simplifies the decoding process, thus improving the efficiency of MDC decoding. The first column is received data (e.g., "x-x-x-1" when only "D4" is received). The second column lists four possible raw samples (e.g., "1, 2, 3, 4"). The third column is the estimation, which can be determined using an average of possible missing descriptions for the current sample. In this example, "2" or "3" can be selected. "Average" here can refer to a weighted average, an average number rounded up or down to the nearest integer, a medium, or a statistically calculated value for the estimation of the current sample based on the description(s) received. The remaining three columns depict the largest possible difference between the estimation and the original value (e.g., "4"), and corresponding errors (absolute error, e.g., "2", and relative error, e.g., "50%). In another example, m4_4 (i.e., description "D4" is the only one of the four descriptions received) is integer "2" ("010"). The possible original sample value can be "5, 6, 7, 8". If "6" or "7" is chosen, the largest estimation error will be two bits. Generally speaking, the estimation error will be less than or equal to ln M bit when only one description is received. For example, when M=2, the biggest estimation error is one bit. When M=4, the biggest estimation error is two bits.

Based on the descriptions received by the decoder, the lookup table can be selected from multiple lookup tables, wherein the multiple lookup tables are predetermined based on the multiple description number and each possible combination of the descriptions received by the decoder. For example, in FIG. 6E, two different tables are shown for M=4, the middle table for the scenario when only "description 4" is received, and the right table for the scenario when "description 3" and "description 4" are received. Similarly, lookup tables can be generated for all possible combinations of the descriptions received by the decoder. The estimation accuracy improves as the number of missing descriptions decreases. For example, when two descriptions "D3" and "D4" are received and they are both integer "2", the right table shows that the original sample can be "7" (or "8") and the error will be "1".

At operation 506, based on a determination that the total number of descriptions received by the decoder is the same as the multiple description number, the current sample is reconstructed by summing the descriptions received by the decoder.

The MDC techniques described in this disclosure can introduce a noticeable improvement in performance, bits savings, and mitigating effects on packet loss. In addition, it can be integrated with existing communication systems. The MDC encoding can be performed to encode a media source stream for transmission with error resilience. Example audio and video encoding processes will be described as follows.

Figure 7:
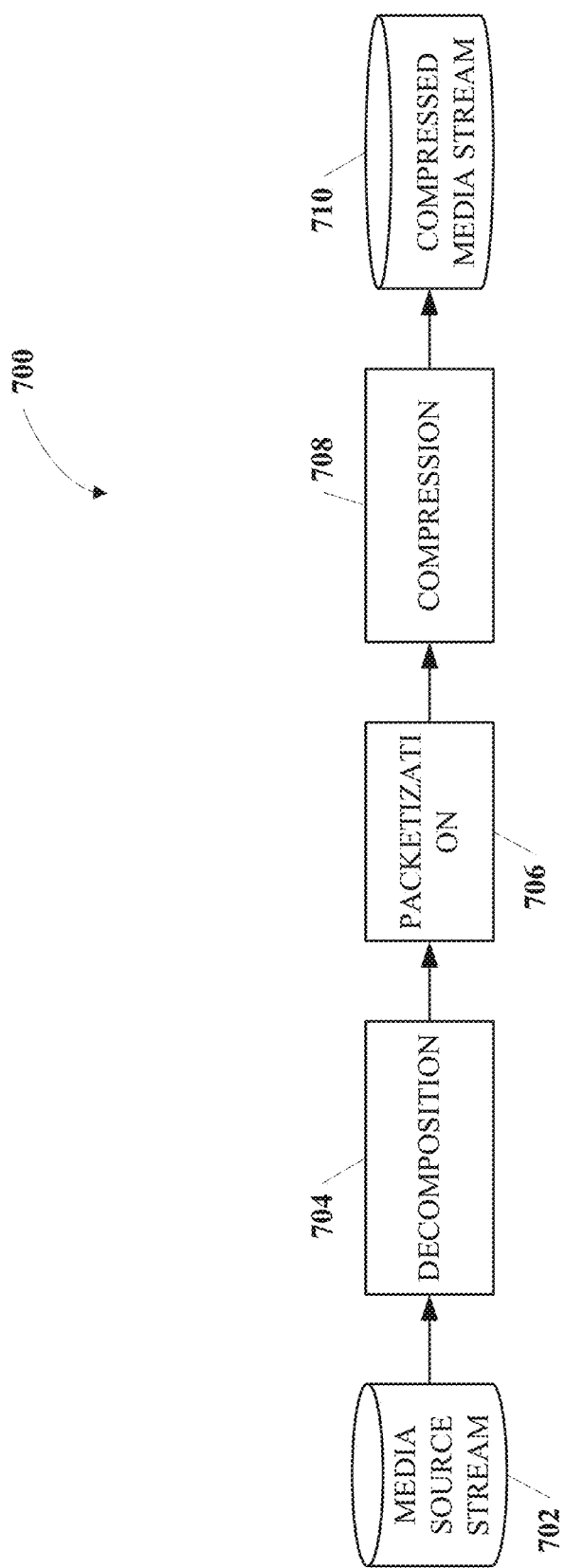
FIG. 7 is a diagram of an example multiple description encoding process that can be used according to implementations of this disclosure.

FIG. 7 is a diagram of an example MDC encoding process 700 that can be used according to implementations of this disclosure. The process 700 can be implemented as software and/or hardware modules in the system 100 in FIG. 1. For example, some or all stages in the process 700 can be implemented as software or hardware modules included in the system 100 by an encoder (e.g., the apparatus 104). The encoder can be implemented by program codes stored in memory (e.g., the memory 118). The program codes can include computer-readable instructions that, when executed by a processor (e.g., the processor 116), cause the encoder to encode a media source stream in the manner described in FIG. 7. The encoder can also be implemented as specialized hardware included in an apparatus (e.g., the apparatus 104). For example, the encoder can be a hardware encoder. The process 700 includes operations 704-708 to produce as output a compressed media stream 710 from a media source stream 702 (e.g., media source stream 200 in FIG. 2). The media source stream 702 can include an audio sequence (such as audio source stream), a video sequence (such as video source stream), or any multimedia source stream including audio and/or video data. The example MDC encoding process 700 (either the whole process or some stages) can be further modified when implementing the multiple description coding based on integer operations of FIGS. 3-5 described above. In some instances, process 700 may not be necessary for the implementations of multiple description coding based on integer operations.

In some implementations, MDC coding can be implemented in addition to, in place of, or as part of existing video or audio coding standards. In other implementations, MDC coding can be implemented without integration with other audio/video systems. Generally, when encoding a video sequence, the encoding process can include one or more of the following stages or operations: a prediction stage (e.g., for intra-prediction or inter-prediction), a transformation stage, and an entropy encoding stage. The aforementioned stages can be included in a forward path of the encoding process. In the forward path of the encoding process, an encoded or compressed video bitstream can be produced using a video sequence as input. In some implementations, the encoding process can further include a reconstruction path for reconstructing reference pictures or frames for encoding a future picture at the prediction stage. The reconstruction path can include an inverse transformation stage and a reconstruction stage between the transformation stage and the prediction stage. It should be noted that other variations of the encoding process can be used to encode the video sequence. For example, although some other coding stages, such as quantization, are not used in the implementations and examples described herein, it should be understood that such stages can be added in certain suitable scenarios.

An audio sequence can be encoded like the video sequence, or using any audio compression techniques. For example, audio compression can include one or more of the following stages: a mapping stage, a coding stage, and a bitstream coding stage. Other stages can replace or added to one or more stages in the example.

It should be noted that other variations of the encoding process can be used to encode the video sequence. The data and operations in the encoding process can be processed and performed in different orders, combined into fewer stages, and/or divided into more stages without changing its purpose. For example, a non-transform based encoder can quantize the residual data without transformation. For another example, an encoder can have transformation and quantization stage performed in different stages.

MDC encoding can be implemented prior to, after, or during any stage of the audio or video encoding process. For example, the MDC encoding can be performed before quantization. For another example, the MDC encoding can be performed after transformation and before quantization. For another example, the MDC encoding can be performed in an encoding process that has no transformation stage. It should be noted that the MDC coding can be applied at other stages in the encoding process.

Referring to the process 700 in FIG. 7, the media source stream 702 is received by the MDC encoder. The term "receive" used herein can refer to receiving, inputting, acquiring, retrieving, obtaining, reading, accessing, or any action in any manner for inputting information or data. For example, the media source stream 702 can be a video stream and include a series of video pictures (e.g., a current picture).

At decomposition stage 704, a block, such as the current block 202, can be divided into multiple samples, and each sample can be decomposed into multiple descriptions (M descriptions) using, for example, operations described in connection with process 300 and FIG. 3. For example, the current block 202 can include a current sample 206.

At packetization stage 706, M descriptions can be packetized for the current block 202. For example, the first description for the current block 202 can be formed by combining all of the first descriptions determined at decomposition stage 704 for all the samples. Similarly, the second description for the current block 202 can be formed by combining all of the second descriptions determined at decomposition stage 704 for all the samples of the current block 202. Each description for the current block 202 can form a block data stream, which can be compressed to remove redundancy before transmitting via the network.

At compression stage 708, the M descriptions can be compressed (e.g., entropy coded) to generate compressed media stream 710, which can be transmitted. For example, entropy coding techniques such as arithmetic coding or Huffman coding can be used to compress the M descriptions. Each description, such as description 204, for the current block 202 can be independently compressed such that loss of any description(s) during transmission will not affect decoding of the received description(s).

In some implementations, one or more error correction techniques can be further applied to the multiple descriptions. The one or more error correction techniques can include, for example, FEC, ARQ, or PLC.

Figure 8:
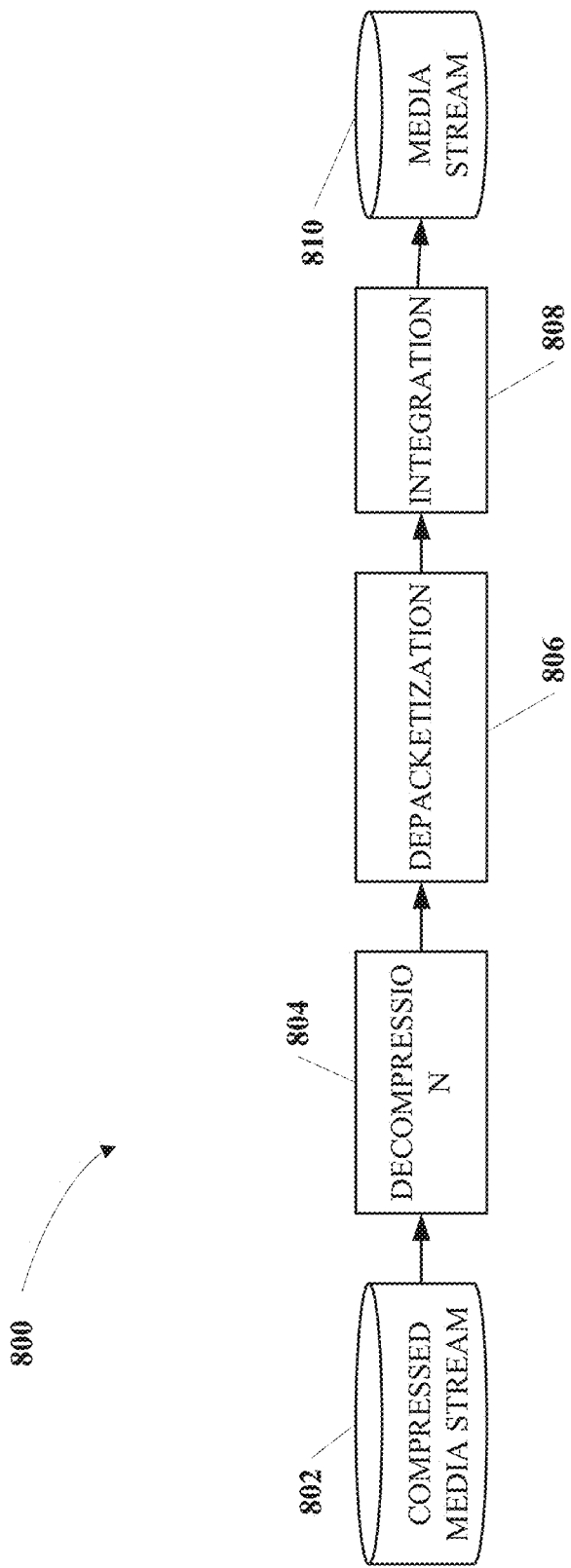
FIG. 8 is a diagram of an example multiple description decoding process that can be used according to implementations of this disclosure.

FIG. 8 is a diagram of an example MDC decoding process 800 that can be used according to implementations of this disclosure. The process 800 can be implemented as software and/or hardware modules in the system 100 in FIG. 1. For example, some or all stages of the process 800 can be implemented as software or hardware modules included in the system 100 by a decoder (e.g., the apparatus 102). The decoder can be implemented by program codes stored in memory (e.g., the memory 110). The program codes can include computer-readable instructions that, when executed by a processor (e.g., the processor 108), cause the decoder to decode a compressed media stream in the manner described in FIG. 8. The decoder can also be implemented as specialized hardware included in an apparatus (e.g., the apparatus 102). For example, the decoder can be a hardware decoder. The process 800 includes operations 804-808 to reconstruct a media stream 810 from a compressed media stream 802. The media stream 810 can include an audio stream, a video stream, or any multimedia stream including audio and video data. The example MDC decoding process 800 (either the whole process or some stages) can be modified when implementing the multiple description coding based on integer operations of FIGS. 3-5 described above. In some instances, process 800 may not be necessary for the implementations of multiple description coding based on integer operations.

For an MDC-compatible decoder, the decoding process is the reversal of the encoding process. The decoder can receive a media stream (e.g., a media bitstream) that includes a compressed media stream, which can be further decoded to one or more descriptions. There might be errors or missing packets in the received encoded descriptions, but based on MDC decoding, the decoded media stream can maintain relatively high fidelity or quality. Typical audio and video decoding processes will be described as follows.

Generally, when decoding a video bitstream, the decoding process is similar to the reconstruction path of the video encoding process and can include the following stages or operations: an entropy decoding stage, an inverse transformation stage, a prediction stage, and a reconstruction stage. It should be noted that other structural variations of the decoding process can be used to decode the video bitstream.

An audio bitstream can be decoded like the video bitstream, or using any audio decompression techniques. For example, audio decompression can include the following stages: a bitstream decoding stage, a reconstruction stage, and an inverse mapping stage. Other stages can be used to replace or in addition to the stages in the example.

It should be noted that other variations of the decoding process can be used to decode the video bitstream. The data and operations in the decoding process can be processed and performed in different orders, combined into fewer stages, and/or divided into more stages without changing its purpose.

In some implementations, the MDC decoding can be implemented prior to, after, or during any stage of the above-described audio or video decoding process. For example, the MDC decoding can be performed between the dequantization and reconstruction stage and the inverse mapping stage of the audio decoding process. For another example, the MDC decoding can be performed after the dequantization and prior to the inverse transformation of the video decoding process. For another example, the MDC decoding can be performed in a decoding process that has no transformation stage. It should be noted that the MDC decoding can be applied in the decoding process not limited to any above-described example stages, and some or all of the subsequent stages in the decoding process can be performed on the received and reconstructed multiple descriptions.

Referring to the process 800, the compressed media stream 802 is received by the MDC decoder. At decompression stage 804, the compressed media stream 802 are decoded to recover a second number (M2) of descriptions. Due to errors introduced in network transmission (such as network congestion and packet loss), the M2 recovered descriptions may not be identical to the M corresponding original descriptions described in FIG. 7 (e.g., M2 can be less than M). This corresponds to compression stage 708 in FIG. 7.

At depacketization stage 806, the M2 descriptions for the current block 202 can be depacketized into M2 descriptions for each sample of the current block 202. For example, M2 descriptions can be determined for the current sample 206 of the current block 202. This corresponds to packetization stage 706 in FIG. 7.

At integration stage 808, the M2 descriptions can be used to reconstruct the current sample 206 for the current block 202 using, for example, operations described in connection with FIG. 4 or 5. This corresponds to decomposition stage 704 in FIG. 7.

Depending on specific data received and recovered in the recovered descriptions, different approaches can be used to reconstruct the media stream 810. The disclosed apparatuses, methods, and systems of encoding and decoding multiple descriptions for the media stream can achieve high efficiency and can be easily integrated with existing coding systems.

As described above, a person skilled in the art should be noted that, all or a portion of aspects of the disclosure described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing, either singly or in combination. The terms "signal" and "data" are used interchangeably. Further, portions of the computing devices do not necessarily have to be implemented in the same manner.

The aspects herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, e.g., memory elements, processing elements, logic elements, look-up tables, and the like, which can carry out a variety of functions under the control of one or more microprocessors or other control devices. Similarly, where the elements of the described aspects are implemented using software programming or software elements the disclosure can be implemented with any programming or scripting language such as C, C++, Java, assembler, or the like, with the various algorithms being implemented with any combination of data structures, objects, processes, routines or other programming elements. Functional aspects can be implemented in algorithms that execute on one or more processors. Furthermore, the aspects of the disclosure could employ any number of conventional techniques for electronics configuration, signal processing and/or control, data processing and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine readable instructions in the form of code for operation of any or any combination of the aforementioned hardware. The computational codes can be implemented in the form of one or more modules by which individual or combined functions can be performed as a computational tool, the input and output data of each module being passed to/from one or more further module during operation of the methods and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The particular aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The use of "including" or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein is merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of examples, or exemplary language (e.g., "such as") provided herein, is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These heading and subheadings are not intended, and should not be used, to affect the interpretation of the claims or limit claim scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for encoding multiple descriptions for a media stream, comprising: determining, for a current sample of the media stream, an integer equivalent based on the value of the current sample;
    determining a first description for the current sample by performing a first shifting operation on the current sample, wherein the first shifting operation comprises right shifting the current sample by one bit;
    based on a determination that the integer equivalent is an even number, determining a second description for the current sample by performing the first shifting operation on the current sample, wherein each of the first description and the second description is independently decodable; and
    based on a determination that the integer equivalent is an odd number, determining the second description for the current sample by performing a second shifting operation on the current sample, wherein the second shifting operation comprises right shifting the current sample by one bit and adding one bit.

2. The method of claim 1, further comprising:
encoding the first description and the second description.

3. The method of claim 1, further comprising:
identifying, for the current sample of the media stream, a multiple description number indicative of a total number of descriptions to be determined for the current sample; and
performing a decomposition operation on the current sample, wherein the decomposition operation comprises forming a binary tree based on the multiple description number, and each description determined for the current sample is represented by a corresponding node of the binary tree.

4. The method of claim 3, further comprising:
determining each description represented by the corresponding node of the binary tree by performing iterative operations on a current description of the current sample:
determining the first description for the current description by performing the second shifting operation on the current sample;
based on the determination that the integer equivalent is an odd number, determining the second description for the current description by performing the first shifting operation on the current sample; and
based on the determination that the integer equivalent is an even number, determining the second description for the current description by performing the second shifting operation on the current sample; and repeating the iterative operations on the first description and the second description until the total number of descriptions determined for the current sample is the same as the multiple description number.

5. The method of claim 3, further comprising: encoding the multiple description number; and encoding each of the total number of descriptions.

6. The method of claim 1, wherein the media stream comprises at least one of an audio stream and a video stream.

7. A method for decoding multiple descriptions for a media bitstream, comprising:
    decoding a first description from a set of multiple descriptions of the media bitstream, wherein the first description is associated with a current sample of the media bitstream and is independently decodable;
    determining that a second description associated with the current sample from the media bitstream is missing;
    based on the determination that the second description is missing, reconstructing, by a decoder, the current sample by performing a third shifting operation on the first description, wherein the third shifting operation on the first description comprises left shifting the first description by one bit.

8. The method of claim 7, further comprising:
    decoding, from the media bitstream, a multiple description number indicative of a total number of description encoded for the current sample; and
    based on a determination that the total number of descriptions received by the decoder is less than the multiple description number, reconstructing the current sample by performing a lookup operation on the descriptions received by the decoder, wherein the lookup operation comprises obtaining an estimation of the current sample by using a lookup table based on at least one of the multiple description number and the descriptions received by the decoder.

9. The method of claim 8, wherein based on a determination that the total number of descriptions received by the decoder is less than the multiple description number, reconstructing the current sample by performing a lookup operation on the descriptions received by the decoder, wherein the lookup operation comprises obtaining an estimation of the current sample by using a lookup table based on at least one of the multiple description number and the descriptions received by the decoder comprises:
    selecting, based on the descriptions received by the decoder, the lookup table from multiple lookup tables, wherein the multiple lookup tables are predetermined based on the multiple description number and each possible combination of the descriptions received by the decoder.

10. The method of claim 8, wherein the estimation of the current sample is obtained from the lookup table by using an average of possible missing descriptions for the current sample.

11. The method of claim 7, further comprising: in response to receiving both a third description and a fourth description associated with another sample, reconstructing, by the decoder, the another sample by summing the third description and the fourth description, wherein the third description and the fourth description are independently decodable.

* * * * *

UNITED STATES PATENT AND TRADEMARK OFFICE
CERTIFICATE OF CORRECTION

PATENT NO.        : 10,630,747 B2
APPLICATION NO.   : 15/842431
DATED             : April 21, 2020
INVENTOR(S)       : Shie Qian et al.

Page 1 of 1

It is certified that error appears in the above-identified patent and that said Letters Patent is hereby corrected as shown below:

In the Claims

Column 18, Line 40, Claim 1: please delete "hit" and insert -- bit --

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*